US011512358B2

(12) United States Patent
Schiesser et al.

(10) Patent No.: US 11,512,358 B2
(45) Date of Patent: Nov. 29, 2022

(54) QUENCHING NOZZLE FOR INDUCTION HARDENING SYSTEM

(71) Applicant: AKTIEBOLAGET SKF, Gothenburg (SE)

(72) Inventors: Roland Schiesser, Hesslar/Karlstadt (DE); Martina Sticht, Sennfeld (DE); Gerhard Wagner, Prichsenstadt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 138 days.

(21) Appl. No.: 16/812,662

(22) Filed: Mar. 9, 2020

(65) Prior Publication Data

US 2020/0308663 A1    Oct. 1, 2020

(30) Foreign Application Priority Data

Mar. 25, 2019 (DE) .......................... 102019204012.8

(51) Int. Cl.
*C21D 1/62* (2006.01)
*C21D 1/10* (2006.01)
*C21D 9/40* (2006.01)
*C21D 1/42* (2006.01)

(52) U.S. Cl.
CPC ................ *C21D 1/10* (2013.01); *C21D 1/42* (2013.01); *C21D 1/62* (2013.01); *C21D 9/40* (2013.01)

(58) Field of Classification Search
CPC . C21D 1/667; C21D 1/10; C21D 9/40; C21D 1/62; C21D 1/42; Y02P 10/25
See application file for complete search history.

(56) References Cited

U.S. PATENT DOCUMENTS

| 3,687,145 | A | * | 8/1972 | Schrader | ............. B21B 45/0218 134/114 |
| 3,738,629 | A | * | 6/1973 | Coleman | ................ C21D 1/667 266/117 |
| 2021/0062291 | A1 | * | 3/2021 | Hinojosa Garza | ..... C21D 9/562 |
| 2021/0087644 | A1 | * | 3/2021 | Powell | ..................... C21D 9/28 |

FOREIGN PATENT DOCUMENTS

JP          2010242153 A   * 10/2010

* cited by examiner

*Primary Examiner* — Rebecca Janssen
(74) *Attorney, Agent, or Firm* — J-TEK Law PLLC; Scott T. Wakeman; Mark A. Ussai

(57) ABSTRACT

An orifice-type quenching nozzle for an induction hardening system includes a body having a plurality of nozzle orifices configured to apply a quenching fluid onto a to-be-quenched workpiece. The nozzle orifices are arranged on at least one surface of the body in rows and in columns, and the plurality of nozzle orifices are positioned such that each nozzle orifice is located a same distance from each directly adjacent nozzle orifice.

11 Claims, 2 Drawing Sheets

QUENCHING NOZZLE FOR INDUCTION HARDENING SYSTEM

CROSS-REFERENCE

This application claims priority to German patent application no. 10 2019 204 012.8 filed on Mar. 25, 2019, the contents of which are fully incorporated herein by reference.

TECHNOLOGICAL FIELD

The present disclosure is directed to an orifice-type quenching nozzle for an induction hardening system having an improved arrangement of nozzles. Furthermore, the present disclosure is directed to an inductive feed hardening system including such a quenching nozzle.

BACKGROUND

An induction hardening system can be used to harden workpieces, for example, a complete workpiece or individual regions of a workpiece (in a feed hardening system, for example). After heating to a required hardening temperature, it is necessary to subsequently quench the workpiece. During quenching a quenching fluid, for example, water, is applied to the workpiece by a nozzle.

However, a relatively stable vapor layer can be formed between the nozzle and the workpiece during the quenching. This is also referred to as the Leidenfrost effect. Here the quenching fluid is applied onto the hot, induction-heated surface of the workpiece, wherein a rapid primary evaporation is achieved, and subsequently quenching fluid floats or slides on the resulting vapor cushion. The quenching fluid can thus no longer reach the workpiece and cool it down, but rather slides on the vapor cushion over the hot material of the workpiece on the steam. The cooling of the workpiece, which is to be effected in the shortest possible time, is extended by this effect. Too-soft regions can therefore arise in the structure of the hardened material after quenching. This effect can arise in particular with inductive feed hardening systems due to the movement of the quenching nozzle.

The above-mentioned effect can be avoided by applying the quenching fluid at a higher pressure that pierces the vapor cushion. However, in this way very point-like cooling regions arise, since the quenching fluid is not uniformly distributed, but rather, due to the high pressure, impacts on the to-be-cooled surface in individual jets and bounces off again there.

Furthermore, the Leidenfrost effect can be avoided by the nozzle having a very high spray distance from the workpiece. Due to the large distance, the shape of the nozzles plays no role and no vapor cushion is formed, since due to the distance the quenching fluid can spread out arbitrarily. However, due to a high spray distance, a targeted cooling of certain regions of the workpiece is difficult. In addition, the consumption of quenching fluid can increase.

SUMMARY

It is therefore an aspect of the present disclosure to provide a quenching nozzle for an induction hardening system, using which an improved cooling behavior can be achieved.

The orifice-type quenching nozzle for an induction hardening system includes a plurality of nozzle orifices through which a quenching fluid, for example, water, is appliable to a to-be-quenched workpiece. Here the nozzle orifices are disposed in rows and columns on a surface of the quenching nozzle. In order to now prevent a vapor layer from being formed between the to-be-quenched or to-be-cooled workpiece and the orifice-type quenching nozzle, each nozzle orifice is formed equidistant in each direction from each directly adjacent nozzle orifice. It is to be noted here that there is at least one first region of the orifice-type quenching nozzle wherein the nozzle orifices are disposed in rows and columns on a surface of the quenching nozzle, and wherein in this region each nozzle orifice is formed equidistant in each direction from each directly adjacent nozzle orifice. Furthermore, there can also be second regions, for example, edge regions or transition regions, wherein the nozzle orifices are arranged in a different manner.

Due to this arrangement of the nozzle orifices with respect to one another, the resulting vapor is discharged from the region between the to-be-quenched workpiece and the orifice-type quenching nozzle, or pushed out by the jet of the quenching fluid from the region between the to-be-quenched workpiece and the orifice-type quenching nozzle. Since the resulting vapor cannot remain in this region as a vapor cushion, subsequent quenching fluid can reach onto the workpiece and cool its surface. The quenching process is thus shortened in comparison to existing nozzles, and the cooling behavior is therefore improved. In addition, old, already heated quenching fluid can also flow off better due to this arrangement.

Furthermore, with this design of the nozzle orifices it is possible to achieve a short and minimum distance, in particular 2 to 5 mm, between the orifice-type quenching nozzle and the workpiece. Here the quenching fluid can be applied very uniformly onto the workpiece.

The quenching nozzle can be manufactured from plastic, e.g., polyamide 12 (PA12), or metal such as stainless steel, e.g., 1.4404. In particular, during the selection of the material a temperature of the quenching fluid can be taken into account. The quenching nozzle can preferably be produced by a 3D-printing method.

According to a further embodiment, for all nozzle orifices, two mutually adjacent nozzle orifices of a first row and a nozzle orifice of a neighboring second row, which is disposed between the two nozzle orifices of the first row, form an equilateral triangle. Due to this arrangement, disturbances of the fluid jets with respect to one another, which fluid jets emerge from the nozzle orifices, can be prevented. Due to the arrangement of the individual nozzle orifices, there is a very low risk of an interaction between the fluid jets of the individual nozzle orifices. In this way, turbulence of the quenching fluid can also be avoided in the contact region between the orifice-type quenching nozzle and the to-be-quenched workpiece. This also improves the cooling behavior, since such turbulence can delay and/or change the impinging of the quenching fluid onto the workpiece.

According to a further embodiment, the distance between two nozzle orifices in the column direction (e.g., measured from orifice center to orifice center) is twice as large as the distance between two nozzle orifices in the row direction. Due to this distance and the associated arrangement of the nozzle orifices with respect to one another, the risk of interactions between the individual nozzle orifices or the quenching fluid emerging from the nozzle orifices can also be avoided. Turbulence of the quenching fluid in the contact region between the to-be-quenched workpiece and the orifice-type quenching nozzle are thereby reduced.

According to a further embodiment the size and/or shape and/or number of nozzle orifices can vary over the surface of the quenching nozzle. In particular, the quenching nozzle can include at least one first region wherein the size and/or shape and/or number of the nozzle orifices is adapted such that a first quenching-fluid discharge is achieved having a first fluid quantity and/or a first fluid speed, and the quenching nozzle includes at least one second region wherein the size and/or shape and/or number of nozzle orifices is adapted such that a second fluid discharge is achieved having a second fluid quantity and/or a second fluid speed. Due to this variable arrangement of the nozzle orifices it is possible to vary the cooling rate over various regions of the to-be-quenched workpiece. Due to different cooling rates at different regions the workpiece can therefore have different degrees of hardness. Furthermore, the cooling rate can be adapted to the size and/or thickness of different regions of the workpiece. For example, a flange and a raceway of a ring can be hardened simultaneously. These can have either the same or different degrees of hardness. This can be achieved in a single hardening and cooling process.

According to a further embodiment, at least one spacer is provided on a surface of the quenching nozzle, which surface faces the to-be-quenched workpiece; the spacer is configured to define a minimum distance between the quenching nozzle and the to-be-quenched workpiece. In this way a minimum distance can be ensured in each case between the quenching nozzle and the to-be-quenched workpiece. The minimum distance ensures that a vapor cushion that may arise on the to-be-quenched workpiece can flow off.

According to a further embodiment, on at least one nozzle orifice, preferably on all nozzle orifices, the quenching nozzle includes a nub-shaped elevation wherein the nozzle orifice is formed. Due to this nub-shaped elevation, the quenching fluid is discharged from the nozzle orifices in a straight-as-possible jet. This can further reduce turbulence of the quenching fluid between the individual nozzle orifices. A defined discharge direction can thus be achieved instead of dispensing a mist of the quenching fluid, which mist is aimed in various directions.

According to a further embodiment, the quenching nozzle is configured for quenching a bearing ring to be inductively hardened and includes a first flat quenching surface and a second flat quenching surface that are set at an angle with respect to each other and that are connected to each other via a connecting surface, wherein each of the surfaces includes a plurality of nozzle orifices. Due to the angular placement of the two quenching surfaces, an optimal guiding of the quenching nozzle along the bearing ring can be ensured. Here the shape of the quenching nozzle is adapted as precisely as possible to the shape of a bearing ring. In particular, the first flat quenching surface is configured for quenching a raceway of the bearing ring to be inductively hardened, and the connecting surface is configured for quenching a retaining flange of the bearing ring to be inductively hardened. In this way different materials, sizes, shapes, etc. of a workpiece can be quenched, wherein the quenching nozzle or the quenching-fluid dispensing can be correspondingly adapted or guided-along. Due to the different surfaces it is possible to guide the quenching nozzle very closely along against the workpiece or the different regions of the workpiece, and to simultaneously carry out an optimal adapting of the cooling to these regions. In particular, the quenching-fluid nozzle is suitable for large workpieces.

According to a further aspect, an inductive feed hardening system is disclosed including at least one quenching nozzle as described above. If a plurality of quenching nozzles are used, a plurality of regions of a single workpiece can be quenched simultaneously. The feed hardening system can operate in particular with a (or also a plurality of) quenching nozzles that move, for example, in opposite directions with respect to an electrical conductor that heats the workpiece. Other directions of movement, e.g., oscillating, are also possible.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
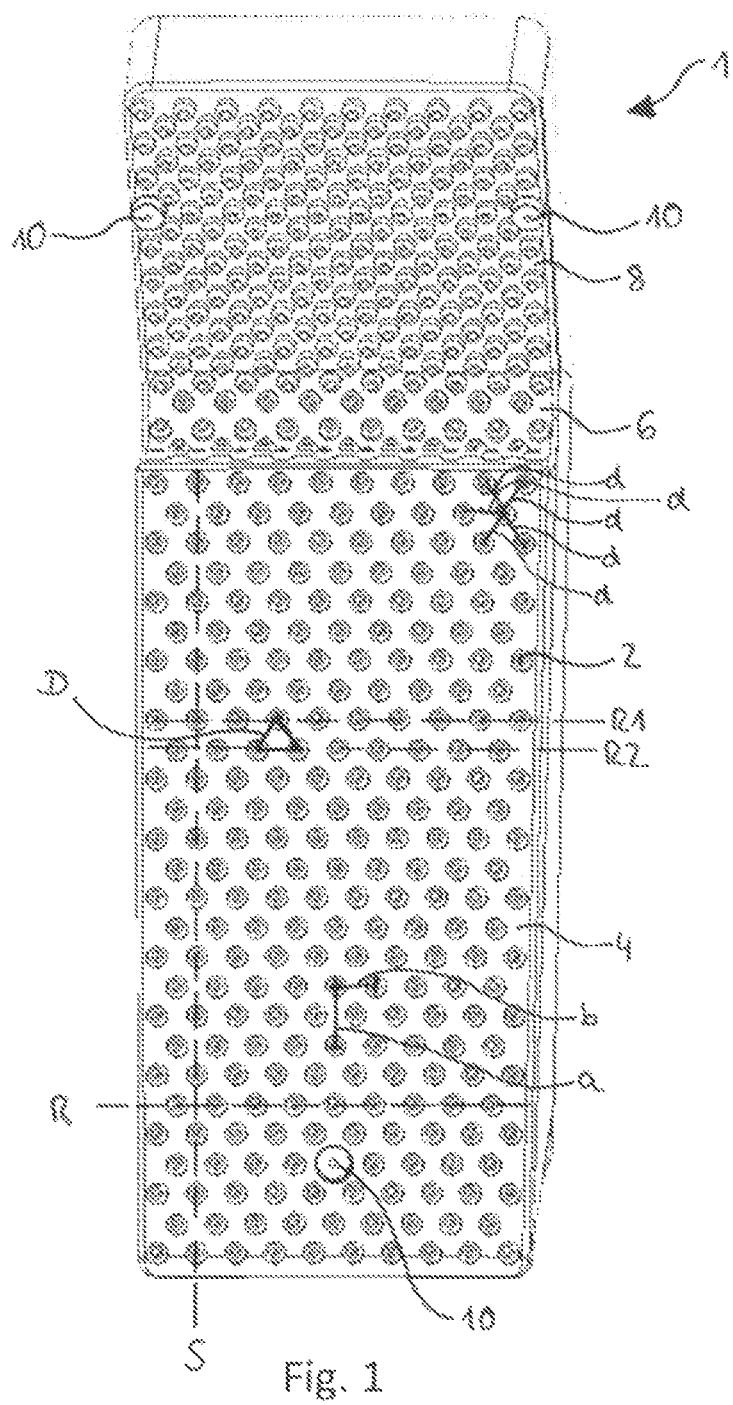
FIG. 1 is a perspective plan view of a quenching nozzle according to the present disclosure.
Figure 2:
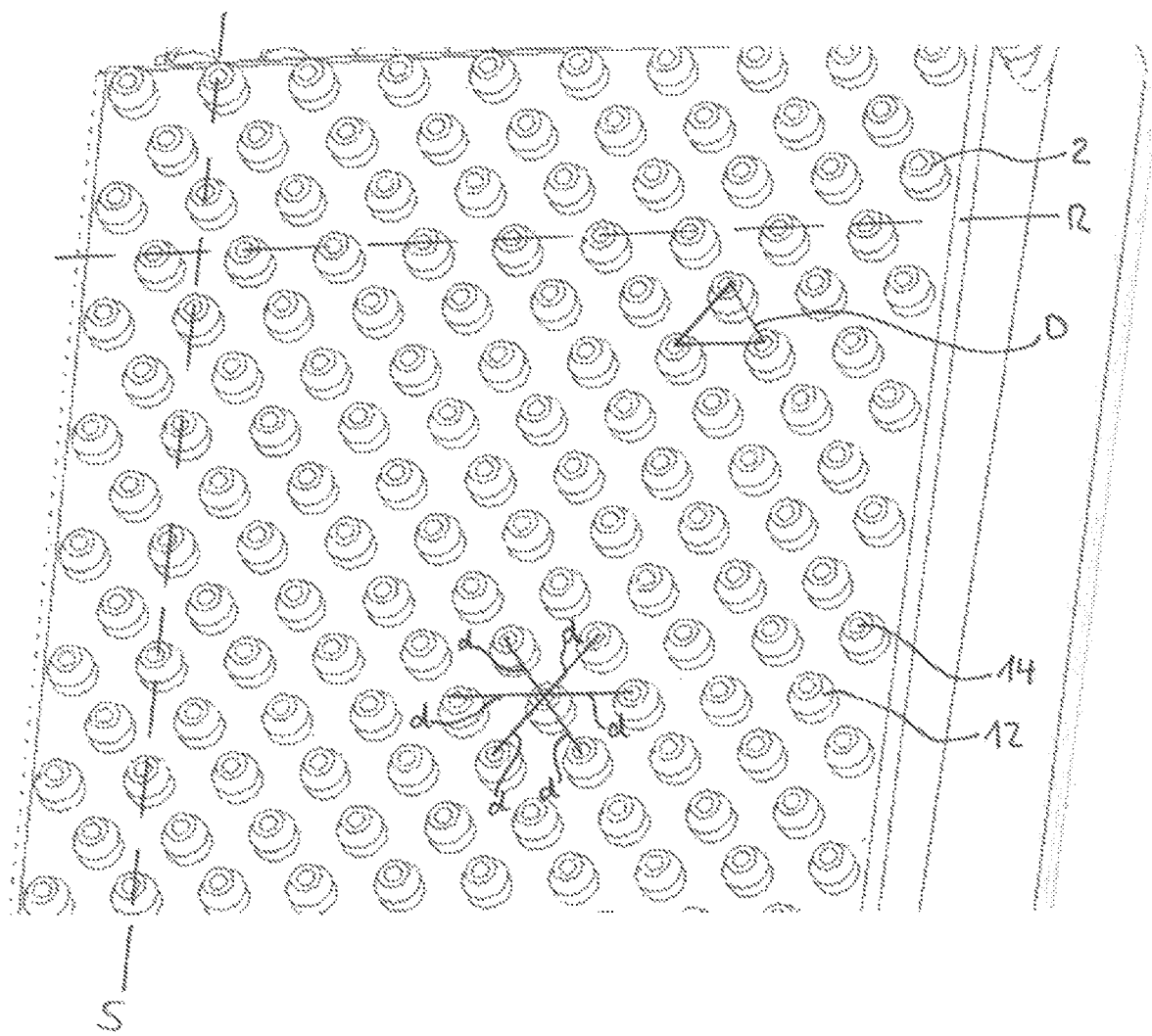
FIG. 2 is an enlarged view of a detail of the quenching nozzle of FIG. 1.

FIG. 1 shows a perspective view of a quenching nozzle 1, and FIG. 2 shows an enlarged detail of the quenching nozzle 1 of FIG. 1. The quenching nozzle 1 includes a plurality of nozzle orifices 2 via which a quenching fluid can be applied to a to-be-quenched workpiece (not shown). Here the nozzle orifices 2 are disposed in rows R and columns S on a surface of the quenching nozzle 1.

In order to prevent a vapor cushion from arising when the quenching fluid contacts the to-be-quenched workpiece, which vapor cushion prevents subsequent quenching fluid from reaching the to-be-quenched workpiece, the nozzle orifices 2 are disposed in the quenching nozzle 1 disclosed here such that each nozzle orifice 2 is formed equidistant in each direction from each directly adjacent nozzle orifice 2. This means that the distance d from each nozzle orifice to each directly adjacent nozzle orifice 2 is the same. As used herein, a first nozzle orifice in a first row of nozzle orifices is directly adjacent to a second nozzle orifice in the first row if there is no additional nozzle orifice in the first row between the directly adjacent nozzle orifices. In addition, the first nozzle orifice in the first row of nozzle orifices is also directly adjacent to the closest two nozzle orifices in a second row of nozzle orifices directly adjacent to the first row of nozzle orifices. Directly adjacent rows of nozzle orifices have no additional row of nozzle orifices therebetween. The nozzle orifices directly adjacent to a given nozzle orifice thus form a hexagon around the given nozzle orifice with the centers of the nozzle orifices located at the vertices of the hexagon.

Due to this arrangement of the nozzle orifices 2 the vapor of the quenching fluid, which vapor arises during the impinging on the workpiece, is discharged from the region between the to-be-quenched workpiece and the quenching nozzle 1, or is pressed out from this region by the jet of the quenching fluid. The resulting vapor cannot remain as a vapor cushion, with the result that subsequent quenching fluid can reach onto the workpiece and cool its surface. Due to this arrangement of the nozzle orifices 2, it is furthermore possible to guide the quenching nozzle 1 as close as possible to the workpiece, in particular at a minimum distance of 2-5 mm.

Furthermore, two mutually adjacent nozzle orifices 2 of a first row R1, and a nozzle orifice of the neighboring second row R2, which is disposed between the two nozzle orifices 2 of the first row R1, form an equilateral triangle D. Due to this arrangement, disturbances of the fluid jets with respect to one another, which fluid jets emerge from the nozzle orifices 2, can be prevented. An interaction between the fluid jets and turbulence of the quenching fluid in the contact region between the quenching nozzle 1 and the to-be-quenched workpiece can be avoided.

Furthermore, the spacing a of two nozzle orifices 2 in the column direction S is twice as large as the spacing b of two nozzle orifices 2 in the row direction R. Due to these spacings a, b and the associated arrangement of the nozzle orifices 2 with respect to one another, the risk of interactions between the individual nozzle orifices 2 or the quenching fluid emerging therefrom is avoided.

The quenching nozzle 1 can preferably include various regions 4, 6, 8 that can vary in the size and/or shape and/or number of nozzle orifices 2. In this way the quenching nozzle 1 can adapt the quenching-fluid discharge in various regions 4, 6, 8 to a workpiece. The quenching-fluid discharge can vary in the fluid amount and/or the fluid velocity. In this way, due to the variable arrangement of the nozzle orifices 2, the cooling rates can be varied over various regions of the to-be-quenched workpiece.

The regions 4, 8 and the region 6 lying therebetween can be set at an angle with respect to one another, wherein the region 6 represents a connecting surface between the two regions 4, 8 set at an angle with respect to each other. Due to the angular positioning of the two regions or quenching surfaces 4, 8, an optimal guiding of the quenching nozzle 1 can be ensured along the workpiece, for example, a bearing ring. The shape of the quenching nozzle 1 can thereby be adapted to the shape, for example, of a bearing ring.

The quenching nozzle 1 can furthermore include one or more spacers 10. This serves to define a minimum distance between the quenching nozzle 1 and the to-be-quenched workpiece. The minimum distance ensures that a vapor cushion that may arise on the to-be-quenched workpiece can flow off.

Here the quenching nozzle 1 of FIG. 1 is moved relative to the to-be-quenched workpiece along the row direction R of the rows. However, it is also possible to arrange the rows R and columns S of the nozzle orifices on the quenching nozzle such that the quenching nozzle is moved relative to the to-be-quenched workpiece along the column direction S. It is advantageous with this arrangement that due to the smaller distance of the orifices in the row direction R, which is then perpendicular to the movement direction, and additionally the next row, which is then offset perpendicularly with respect to the movement direction by half of the spacing of the adjacent orifices, a very uniformly distributed quenching flow impinges on the workpiece. Furthermore, the larger spacing of the orifices in the column direction S is compensated by the movement in the column direction, since the same point is also traversed by the next nozzle orifice of the column.

The nozzle orifices 2 can include a nub-shaped elevation 12, as is depicted in FIG. 2. In the middle of the nub-shaped elevation 12, an opening 14 is provided in order to discharge the quenching fluid. Due to the nub-shaped elevations 12, the quenching fluid is discharged from the nozzle orifices 2 in a straight-as-possible jet. Due to this straight discharging of the quenching fluid, a defined discharging direction can be achieved, whereby turbulence of the quenching fluid can be further reduced between the individual nozzle orifices 2.

Due to the quenching nozzle disclosed herein and the special arrangement of the nozzle orifices with respect to one another, turbulence or disturbances of the quenching fluid can be prevented between the nozzle orifices. Furthermore, vapor that can arise during the impinging of the quenching fluid on the to-be-quenched workpiece can flow off better. The cooling rate of the workpiece can thereby be improved.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved quenching nozzles.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Quenching nozzle
2 Nozzle orifices
4 Region
6 Region
8 Region
10 Spacer
12 Elevation
14 Opening
a, b Spacing
d Distance
D Triangle
R, R1, R2 Row
S Column

What is claimed is:
1. An orifice-type quenching nozzle for an induction hardening system comprising:
a body including a plurality of nozzle orifices configured to apply a quenching fluid onto a to-be-quenched workpiece,
wherein the plurality of nozzle orifices are arranged on at least one surface of the body in rows and in columns, wherein the plurality of nozzle orifices are positioned such that each nozzle orifice is located a same distance from each directly adjacent nozzle orifice, and wherein the at least one surface includes a plurality of projecting nubs and wherein a respective nozzle orifice of the plurality of nozzle orifices is formed on each of the plurality of projecting nubs.

2. The quenching nozzle according to claim 1, wherein it is true for each two mutually adjacent nozzle orifices in a first row that a nozzle orifice in a second row directly adjacent the first row forms an equilateral triangle with the two mutually adjacent nozzle orifices.

3. The quenching nozzle according to claim 2, wherein a spacing of a first pair of the plurality of nozzle orifices adjacent in a column direction is at least twice as large as a spacing of a second pair of the plurality of nozzle orifices adjacent in a row direction.

4. The quenching nozzle according to claim 1, wherein a size of the plurality of nozzle orifices and/or a shape of the plurality of nozzle orifices and/or a number of the plurality of nozzle orifices per unit area varies over the at least one surface of the body.

5. The quenching nozzle according to claim 4, wherein the body includes at least one first region in which the size of the plurality of nozzle orifices and/or the shape of the plurality of nozzle orifices and/or the number of the plurality of nozzle orifices per unit area is adapted such that a first quenching-fluid discharge is achieved having a first fluid quantity and/or a first fluid speed, and includes at least one second region wherein the size of the plurality of nozzle orifices and/or shape of the plurality of nozzle orifices and/or the number of the plurality of nozzle orifices per unit area is adapted such that a second quenching-fluid discharge is achieved having a second fluid quantity different than the first fluid quantity and/or a second fluid speed different than the first fluid speed.

6. The quenching nozzle according to claim 1, wherein at least one spacer is provided on the at least one surface of the body, the at least one surface being configured to face the to-be-quenched workpiece, and wherein the at least one spacer is configured to define a minimum spacing between the body and the to-be-quenched workpiece.

7. The quenching nozzle according to claim 1, wherein the quenching nozzle is configured for quenching a bearing ring to be inductively hardened, and wherein the at least one surface comprises a first flat quenching surface and a second flat quenching surface that are set at an angle with respect to each other and are connected to each other by a connecting surface, wherein the first flat quenching surface and the second flat quenching surface and the connecting surface each includes a plurality of the nozzle orifices.

8. The quenching nozzle according to claim 7, wherein the first flat quenching surface is configured for quenching a raceway of the bearing ring to be inductively hardened, and the connecting surface is configured for quenching a retaining flange of the bearing ring to be inductively hardened.

9. The quenching nozzle according to claim 1, wherein each nozzle orifice of the plurality of nozzle orifices has an orifice center;

wherein each nozzle orifice of a subset of the plurality of nozzle orifices is surrounded by exactly six additional nozzle orifices of the plurality of nozzle orifices directly adjacent to the each nozzle orifice of the subset of the plurality of orifices, the six additional nozzle orifices being arranged in a hexagon such that the orifice centers of the six additional nozzle orifices are located at the vertices of the hexagon, and wherein the orifice center of the each nozzle orifice of the subset of the plurality of orifices is a same distance from the orifice center of each of the six additional nozzle orifices.

10. The quenching nozzle according to claim 9, wherein the body has a front edge and a rear edge relative to an intended direction of movement of the body along the to-be-quenched workpiece, wherein the columns extend in a column direction parallel to the front edge, and wherein the rows extend in a row direction perpendicular to the column direction.

11. An inductive feed hardening system including at least one quenching nozzle according to claim 1.

* * * * *